(12) United States Patent
Thodeti et al.

(10) Patent No.: US 11,863,967 B2
(45) Date of Patent: Jan. 2, 2024

(54) WIRELESS HEADSET SYSTEM

(71) Applicant: Panasonic Automotive Systems Company of America, division of Panasonic Corporation of North America, Peachtree City, GA (US)

(72) Inventors: Janardhan Thodeti, Peachtree City, GA (US); Rajgopal Shrikanth, Peachtree City, GA (US); Arun Krishnan Padmakumar, Peachtree City, GA (US); Dallas Hickerson, Sharpsburg, GA (US); Jason Weida, Peachtree City, GA (US); Nitish James, Peachtree City, GA (US); Senthilnathan Subramanian, Peachtree City, GA (US); Shyamkumar Kurra, Peachtree City, GA (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 68 days.

(21) Appl. No.: 17/541,567

(22) Filed: Dec. 3, 2021

(65) Prior Publication Data

US 2022/0191640 A1    Jun. 16, 2022

Related U.S. Application Data

(60) Provisional application No. 63/125,111, filed on Dec. 14, 2020.

(51) Int. Cl.
| | |
|---|---|
| *H04S 7/00* | (2006.01) |
| *H04R 3/12* | (2006.01) |
| *B60W 50/14* | (2020.01) |

(52) U.S. Cl.
CPC ............. *H04S 7/308* (2013.01); *B60W 50/14* (2013.01); *H04R 3/12* (2013.01); *H04S 7/302* (2013.01);
(Continued)

(58) Field of Classification Search
None
See application file for complete search history.

(56) References Cited

U.S. PATENT DOCUMENTS

| | | | | |
|---|---|---|---|---|
| 2007/0140187 A1* | 6/2007 | Rokusek | .................. | H04L 67/51 370/338 |
| 2014/0309886 A1* | 10/2014 | Ricci | .................... | G07C 5/0833 701/41 |

(Continued)

FOREIGN PATENT DOCUMENTS

CN          106814666 A    *    6/2017

OTHER PUBLICATIONS

English machine translation of CN-106814666-A (Year: 2017).*

*Primary Examiner* — James K Mooney
(74) *Attorney, Agent, or Firm* — Laurence S. Roach, Esq.

(57) ABSTRACT

Examples of the disclosure relate to example systems and methods for operating wireless headset system for a vehicle. An example system includes a first wireless chipset to handle communication with a smartphone, and a second wireless chipset to handle communication with a headset. The example system also includes a processor configured to execute a first virtual machine to control the first wireless chipset and a second virtual machine to control the second wireless chipset.

20 Claims, 4 Drawing Sheets

(52) U.S. Cl.
CPC ...... *H04R 2420/03* (2013.01); *H04R 2420/05* (2013.01); *H04R 2420/07* (2013.01); *H04R 2499/13* (2013.01)

(56) References Cited

U.S. PATENT DOCUMENTS

2018/0307515 A1* 10/2018 Meller .................. H04L 67/125
2019/0098408 A1* 3/2019 Bal ......................... G06F 3/162

* cited by examiner

100A

100B

WIRELESS HEADSET SYSTEM

CROSS-REFERENCED TO RELATED APPLICATIONS

This application claims the benefit of U.S. Provisional Application No. 63/125,111, filed on Dec. 14, 2020, the disclosure of which is hereby incorporated by reference in its entirety for all purposes.

FIELD OF THE INVENTION

The present disclosure generally relates to a method, system, and device for processing audio in a wireless headset system.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

When passengers enter vehicle with personal headsets connected to smartphones, vehicle audio and alerts are not available through the headset. If the headset is connected to the vehicle infotainment system, some of the smartphone audio features are unavailable.

SUMMARY

The present disclosure generally relates to techniques for processing and wirelessly routing audio in a system that can handle multiple wireless headsets and multiple wireless user devices such as smart phones. In some embodiments, the system described herein is deployed in an enclosed environment such as a vehicle. An example system can include a first wireless chipset to handle communication with a smartphone, and a second wireless chipset to handle communication with a headset. The example system also includes a processor configured to execute a first virtual machine to control the first wireless chipset and a second virtual machine to control the second wireless chipset.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1A:
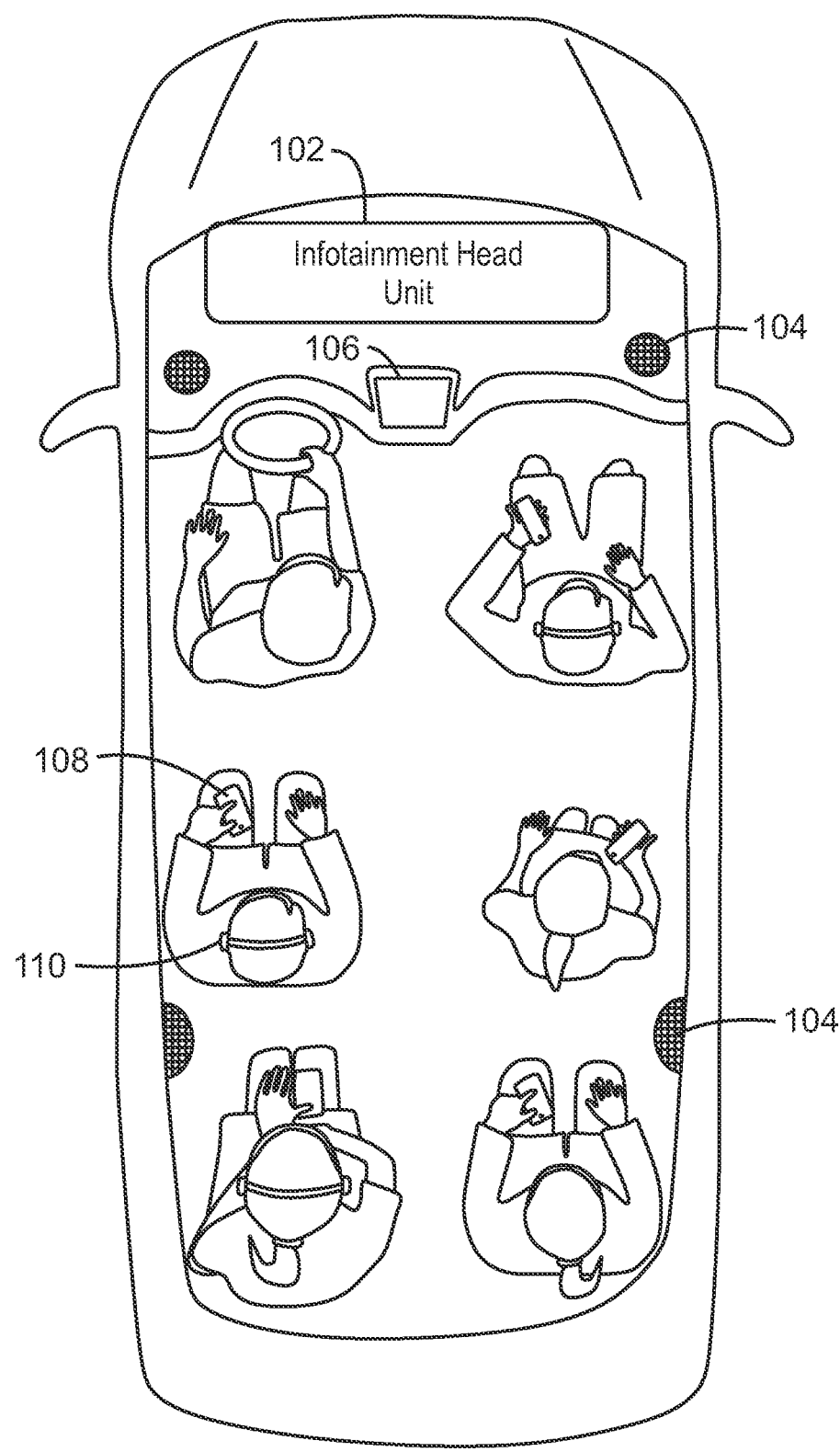
FIG. 1A is an example of a vehicle configured with a wireless headset system.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

This disclosure describes techniques for integrating the functionalities of a vehicle infotainment system, one or more smartphones, and one or more headsets to provide a better user experience. The vehicle infotainment system is configured such that it can support multiple smartphones and headset connections simultaneously. The system enables passengers to pair a smartphone and headset with the vehicle infotainment system to enable the vehicle infotainment system to route smartphone audio and vehicle audio to the headsets, blend alerts into the audio, exchange intercom messages between users, receive voice commands from the users, and for other infotainment operations.

In some embodiments, multiple passenger smartphones and headsets can be integrated with the vehicle infotainment system using one or more onboard wireless chipsets, and one or more operating systems to run wireless communication software stacks and audio routing algorithms. When there is only one passenger, both the smartphone and the headset connections can be supported by a single wireless chipset that enables both server (for headset connection) and client (for smartphone connection) profiles on the wireless communication stack. When there are two or more passengers, smartphone connections and headset connections are supported by server profiles and client profiles running on separate wireless communication chipsets.

In some embodiments, the operating system is capable of supporting the multiple wireless communication stacks used to control the multiple wireless chipsets. However, in some cases, the operating system may be configured to only support a single wireless communication stack. In such cases, the ability to support multiple wireless communication stacks is achieved via a hypervisor and multiple virtual machines supporting multiple wireless communication stacks. For example, one wireless chipset may be supported by a wireless communication stack residing in a primary operating system, and each additional wireless chipset may be supported by separate wireless communication stacks residing in separate guest operating systems.

FIG. 1A is an example of a vehicle configured with a wireless headset system. Embodiments of the present techniques may be described in the context of a vehicle such as an automobile 100A. However, the techniques may be used in substantially any type of vehicle, including aircraft, watercraft, busses, trains, and others. Additionally, embodiments of the present techniques may also be employed in other contexts such as a home or office space, for example.

As shown in FIG. 1A, the vehicle 100A includes an infotainment head unit 102. The infotainment head unit 102 provides the ability to render various types of media, such as radio broadcasts, recorded media such as movies and music, and the like. The infotainment head unit 102 may be configured to deliver audio through the cabin of the vehicle 100A through one or more speakers 104 arranged throughout the vehicle 100A. The infotainment head unit 102 may also be configured to deliver video media to one or more display screens 106. The infotainment head unit 102 can be accessed, for example, through a graphical user interface accessible from the display screens.

In addition to delivering media to components of the vehicle 100A, the infotainment head unit 102 can also control the delivery of media targeted to specific individuals. As shown in FIG. 1, there may be several passengers within a vehicle, each possessing a separate smart phone 108 and a headset 110. Each passenger may be able to pair their own smart phone to their own headset. However, in such cases, the passengers will be isolated from one another and do not share a common user experience.

To provide a more integrated user experience, the infotainment head unit 102 can be configured to coordinate the pairing of smart phones 108 and headsets 110 and control the routing of audio and other data between the smart phones and the corresponding headsets. In this way, each passenger can enjoy a media environment customized to their own tastes, while also being integrated within a shared experience mediated by the head infotainment unit 102. For example, the head infotainment unit 102 can be used to facilitate passenger-to-passenger communication, media sharing, voice commands, vehicle alerts, and other operations.

The infotainment head unit 102 is implemented as processing hardware or a combination or hardware and software. For example, the infotainment head unit 102 may be implemented on a dedicated microprocessor such as an Application Specific Integrated Circuit (ASIC), as software or firmware executing on a general purpose processor, and the like. The passenger's smart phone 108 may be equipped with an app that allows the user to access features of the infotainment head unit 102 described herein.

Each passenger can pair a smart phone and headset with the vehicle infotainment system 102 following a vehicle infotainment user guide, for example. The pairing identifies the smart phone and the headset and configures the infotainment head unit 102 to route streaming audio from the user's smart phone to the same user's headset. After the pairing, the user can select media through interactions with the smart phone and stream the audio through the infotainment head unit to the user's headset. The pairing may be stored by the infotainment head unit 102 to facilitate automatic pairing the next time the user enters the vehicle with the same smart phone and headset. Communication between the smart phone 108, the headset 110, and the infotainment head unit 102 may be performed using any suitable wireless communication technology, such as Bluetooth or WiFi.

In some embodiments, the infotainment head unit 102 may also be configured to deliver vehicle audio to the headsets. The vehicle audio may be audio originating from the vehicle's AM/FM radio, satellite radio, DVD player, and others. Users may have the option of selecting the vehicles audio subsystems to select a particular source from which to receive the audio.

The present techniques also enable intercom communication between users. A user that has a paired smart phone and headset may be able to select one or more other passengers to communicate with. The infotainment head unit 102 can then route the audio received from the originating passenger's smartphone to the one or more destination headsets.

The infotainment head unit 102 may also be configured to facilitate media sharing between passengers. For example, media streamed by one passenger's smart phone to the infotainment head unit 102 may be streamed to the headsets 110 of one or more additional passengers or to the audio subsystem of the vehicle 100A to be rendered over the speakers 104.

In some embodiments, various types of alerts may be blended in with the audio streamed to each of the headsets 110. Alerts may be generated by the infotainment head unit 102 based on data collected from other vehicle subsystems. Examples of alerts include alerts related to navigation directions, road and traffic awareness alerts, weather conditions, and others. Some alerts, such as traffic alerts and weather condition alerts, may be received wirelessly from a remote computing device.

In some embodiments, the infotainment head unit 102 may be configured to process voice commands from the passengers. A passenger may be able to issue a voice command through their smart phone 108, and the audio captured by the smart phone 108 can be sent to the infotainment head unit 102. Voice commands may be detected by detecting a voice command prompt from the user, which may be button press on the smart phone or a vocal prompt such as a wake-up word. Once a voice command prompt is detected, the speech following the prompt may be captured and processed using speech recognition techniques to identify the type of voice command and other details associated with the voice command.

The infotainment head unit 102 can process the voice command and respond with an appropriate action. Examples of voice commands may be commands to control a subsystem of the vehicle 100A, such as a seat controller, a climate control system, door locks, windows, and the like. For example, the voice command may be a command to change the temperature associated with climate control or a heated seat. In some cases, the voice command may be a request for rendering media such as a particular song, or a request to tune a car radio to a specific channel, for example. Another voice command may be a request for playing a movie or other audio visual media. A wide variety of additional voice commands are also possible. The infotainment head unit 102 may also generate confirmation messages related to the voice command and send the messages to the headset 110 of the person that issued the voice command. For example, the conformation message may be a massage indicating that a voice command was detected and indicating the details of the voice command as interpreted by the infotainment head unit 102. An example system for implementing the wireless headset system is described further in relation to FIG. 2.

Figure 1B:
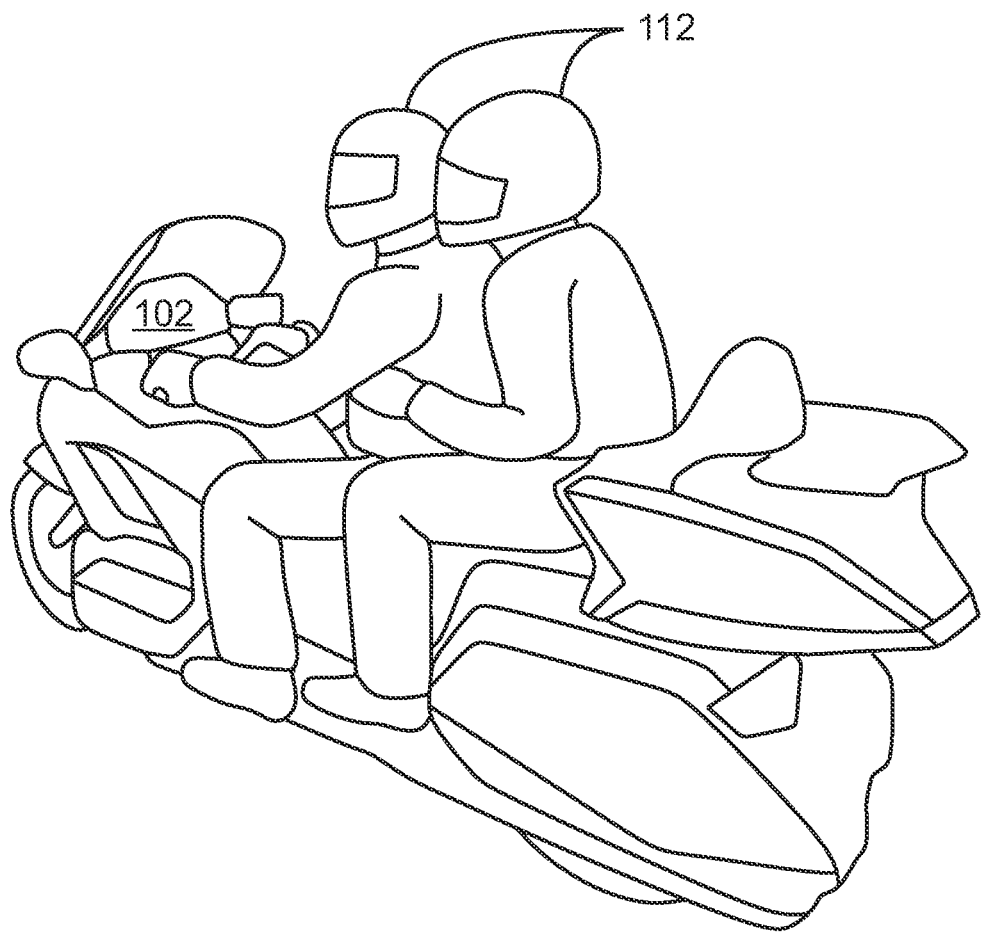
FIG. 1B is another example of a vehicle configured with a wireless headset system.

FIG. 1B is another example of a vehicle configured with a wireless headset system. The system described in relation to FIG. 1B is similar to the system described in relation to FIG. 1A, but implemented in a motorcycle 100B. As in the system of FIG. 1A, the system of FIG. 1B also includes the infotainment head unit 102, which is configured to provide information and media content to one or more motorcycle riders and control the delivery of media targeted to specific individuals. As in the system of FIG. 1A, the head infotainment unit 102 can be used to facilitate passenger-to-passenger communication, media sharing, voice commands, vehicle alerts, and other operations. In the system of FIG. 1B, both riders are wearing helmets 112, each of which may be equipped with built-in headsets. Each headset may include speakers for delivering audio content and a microphone for receiving audio such as intercom messages or voice commands. The headsets within the helmets 112 may be paired with the infotainment head unit 102 as described in relation to FIG. 1A.

Although not shown, each rider may also have a smart phone that can also be paired with the infotainment head unit 102. User input to the head infotainment unit 102 can be received from each rider's smartphone when operation conditions allow for safe operation, such as when the motorcycle is parked. When the motorcycle is in motion, user input to the head infotainment unit 102 may be received through voice commands spoken in the microphones disposed in each helmet 112. An example system for implementing the wireless headset systems of FIGS. 1A and 1B is described further in relation to FIG. 2.

Figure 2:
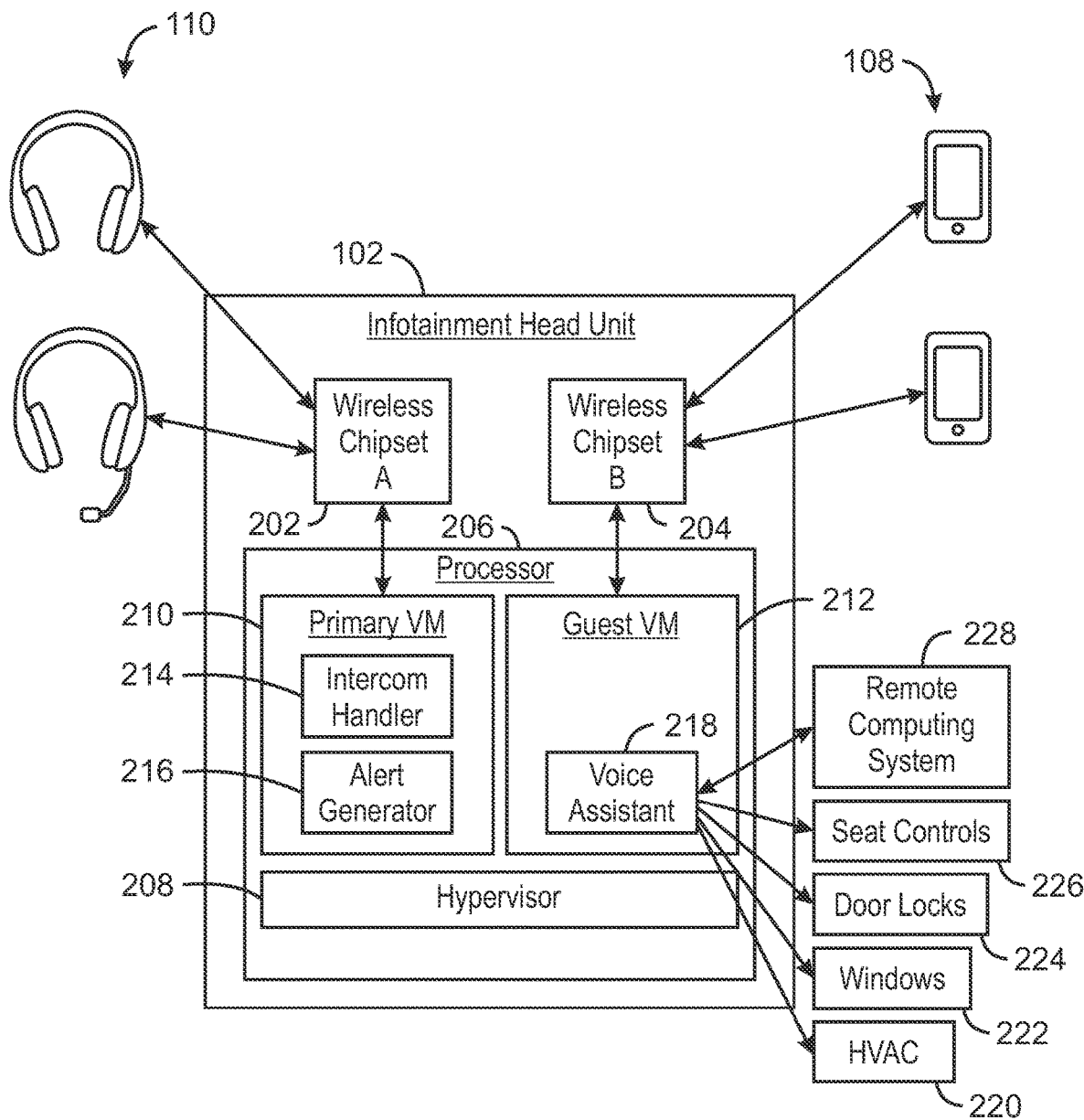
FIG. 2 is a block diagram of an example wireless headset system.

FIG. 2 is a block diagram of an example wireless headset system. As shown in FIG. 2, the system 200 includes the infotainment head unit 102 communicatively coupled to multiple smart phones 108 and multiple headsets 110. In some examples, the smart phones 108 may have a downloadable app that enables the user to provide input to the infotainment head unit 102 to activate the features described herein. Each headset can include speakers for generating audio and may also include a microphone for capturing voice messages and/or voice commands from the wearer of the headset. Additionally, the headsets 110 may have input devices, such as buttons for providing input to infotainment head unit 102. The infotainment head unit 102 may also have a user interface, such as a touch screen disposed in the vehicle's dashboard.

The infotainment head unit 102 is a built-in vehicle unit that includes electronic components that interconnect with the vehicle itself as well as component systems such as navigation systems, audio systems, media systems, and voice assistants. The smart phones 108 and headsets 110 are units that are brought into the vehicle and can be paired to the infotainment head unit 102. Any suitable type of smart phones and headsets may be used. Additionally, although two smart phones and two headsets are shown, it will be appreciated that the system 200 can be configured to handle additional smart phones and headsets.

Communication between the smart phones 108, the headsets 110, and the infotainment head unit 102 is handled by wireless chipsets, referred to herein as wireless chipset A 202 and wireless chipset B 204. Each wireless chipset 202/204 includes electronic components used to establish wireless communication with a device, including wireless transceivers, digital-to-analog converters, analog-to digital-converters, encoders, decoders, and others. The wireless chipsets 202 and 204 may use a Bluetooth and/or WiFi communication protocol or other suitable wireless communication protocol. As shown in FIG. 2, wireless chipset A 202 is configured to handle wireless communication with the headsets 110 and wireless chipset B 204 is configured to handle wireless communications with the smart phones 108.

The infotainment head unit 102 also includes a processor 206 such as a system on a chip (SOC) processor. The processor 206 can include multiple processing cores and serves as the central processing unit for the infotainment head unit 102. The processor 206 may include various sub-units, including a graphical processing unit, digital signal processing units, memory management units, and several communication busses for peripherals.

The processor 206 is also configured to run two or more virtual machines (VMs), which are created and run by a hypervisor 208. The system shown in FIG. 2 includes two virtual machines, referred to herein as the primary VM 210 and the guest VM 212. However, it will be appreciated that the processor 206 may be configured to operate additional virtual machines, depending on the details of a specific implementation. Each virtual machine executes a separate operating system, and each operating system is configured to control one of the wireless chipsets 202/204. In this way, the capabilities of the infotainment head unit 102 can be expanded to provide support for two or more wireless chipsets with little or no changes to the original operating system of the infotainment head unit 102. As shown in FIG. 2, the primary VM 210 is coupled to wireless chipset A 202 and is responsible for managing communications with the headsets 110, while the guest VM 212 is coupled to wireless chipset B 204 and is responsible for managing communications with the smartphones 108. Communications between the primary VM 210 and the guest VM 212 may be controlled by the hypervisor 208. For example, communication between the primary VM 210 and the guest VM 212 can implemented through virtual I/O, shared memory, and other techniques.

The processor 206 is configured to execute various programming modules for operating the features provided by the infotainment head unit 102, including an intercom handler 214, alert generator 216, and voice assistant 218, among others. The programming modules may be stored to any suitable type of non-transitory computer-readable medium, such as solid-state memory, flash memory, a hard drive, and others. In the system shown in FIG. 2, the intercom handler 214 and the alert generator 216 reside on the primary VM 210, which is configured to manage communication with the headsets 110, and the voice assistant 218 resides on the guest VM 212, which is configured to manage communication with the smart phones 108. This arrangement helps to minimize communication between the virtual machines. However, other arrangements are also possible.

Each user can pair the vehicle infotainment system 102 with a smartphone 108 or a headset 110 or both. The initial pairing can be accomplished through a user interface displayed by the infotainment head unit and/or the user's smart phone. For example, to pair a smartphone 108 or headset 110, the user can select a name or MAC address from a displayed list of available devices for the user to connect. The user can also choose to disconnect or delete a previously paired device. Once paired, the smartphone 108 and/or headset 110 is automatically connected to the vehicle infotainment system 102 when Bluetooth/WiFi is turned ON and within the range. Additionally, each smartphone 108 and headset 110 can be associated with a particular user.

Once paired, audio playing on the vehicle infotainment system 102 can be routed to all connected headsets 110. Each user may be able to select a variety of media sources such as AM, FM, SXM, DAB, USB, Internet radio, and more to play on vehicle speakers and headsets 110. Each user may also be able to stream audio from their smartphone 108 to the infotainment head unit 102. Audio streamed to the infotainment head unit 102 from a user's smartphone may be routed to their own headset 110, to all of the headsets 110, or to selected headsets 110. For example, each user may be able to view a list of audio streams originating from connected smart phones 108. The list may identify the user uploading the audio stream as well information about the audio stream itself, such as artist, album title, song title, and the like. Selection of an audio stream from the list will cause the audio to be streamed from the infotainment head unit 102 to the user's headset 110.

The intercom handler 214 handles intercom voice communication between the users. In some embodiments, a user may be able to select a specific headset 110 by name or MAC address from the vehicle infotainment system or the user's smartphone to activate the intercom feature. Any number of headsets 110 can be added to the intercom while in a call. During the intercom session, voice messages may be captured by the speaker's smart phone 108 and routed by the head infotainment unit 102 to the headsets 110 of the intended recipients. In the example shown in FIG. 2, audio captured by the smartphone 108 is received by the guest VM 212 and passed from the guest VM 212 to the primary VM 210 for delivery to the targeted headsets 110. While the intercom session is in progress with one or more users, remaining users in the vehicle can continue to listen to other audio sources on the headsets 110 uninterrupted.

In some examples, one or more passengers may have headsets equipped with microphones for capturing audio. Accordingly, voice messages may also be captured by the user's headset 110. In the example system shown in FIG. 2, audio captured by the headset 110 is received by the primary VM 210 from the wireless chipset A 202 and processed by the intercom handler 214 for delivery to the targeted headsets 108.

The alert generator 216 enables vehicle subsystems to issue alerts to the vehicle speakers and headsets 110. Some of the alerts may include but are not limited to navigation turn-by-turn directions, road awareness alerts including traffic signs, road works, diversions, pedestrians, emergency vehicles, weather conditions, and more. Some alerts may also relate to conditions of the vehicle itself, such as safety alerts describing a status of one or more of the vehicle's subsystems. For example, an alert may be issued indicating that a door is ajar or unlocked.

The voice assistant 218 enables the users to issue voice commands to the head infotainment unit 102. The voice assistant 218 can be initiated by a wakeup word or by pressing a button on the user's headset 110 or smartphone 108, for example. While the voice assistant session is in progress with a user, remaining users in the vehicle continue to listen to the audio uninterrupted on the headsets 110. Voice commands may engage various vehicle subsystems such as the HVAC 220, windows 222, door locks 224, seat controls 226, and other systems. For example, a user may issue a voice command requesting that the vehicle's doors be locked, a seat be adjusted, or a temperature of the climate control system be adjusted. Other types of voice commands are also possible.

In some embodiments, the voice assistant 218 may be coupled to a remote computing system 228 through a wireless network. The remote computing system 228 may be a cloud computing system, a server, or a personal computer, for example. In some embodiments, the remote computing system 228 may include a remote voice assistant that provides additional computing resources for performing speech recognition. The remote computing system 228 enables users to issue voice commands for controlling external systems, or retrieving content from a content provider through the Internet. For example, users may be able to issue voice commands related to controlling equipment associated with the user's home. For example, the voice command may be a request to turn on lights at the user's home, adjust a thermostat temperature setting, open a garage door, and others.

In some cases, the voice command may be a request for information or a request to render audio such as music. In such cases, the requested content may be obtained through the remote computing system 228 and delivered to the infotainment head unit 102. The infotainment head unit 102 may then route the content to the vehicle's audio subsystem or the headset 110 of the user requesting the content. Examples of media content include media files such as audio files, video files, streaming media, and others. In some cases, the voice command may be request for information, and the requested content may be an audio clip responding with the requested information. The infotainment head unit 102 may obtain the content through the internet from various sources, including content providers such as music streaming services, video-sharing services, and others.

Simplified examples are presented herein. However the teachings shown here can be extrapolated beyond the examples shown to include any number of different functionalities. Additionally, it is to be understood that the block diagram of FIG. 2 is not intended to indicate that the system 200 is to include all of the components shown in FIG. 2. Rather, the system 200 can include fewer or additional components not illustrated in FIG. 2.

Figure 3:
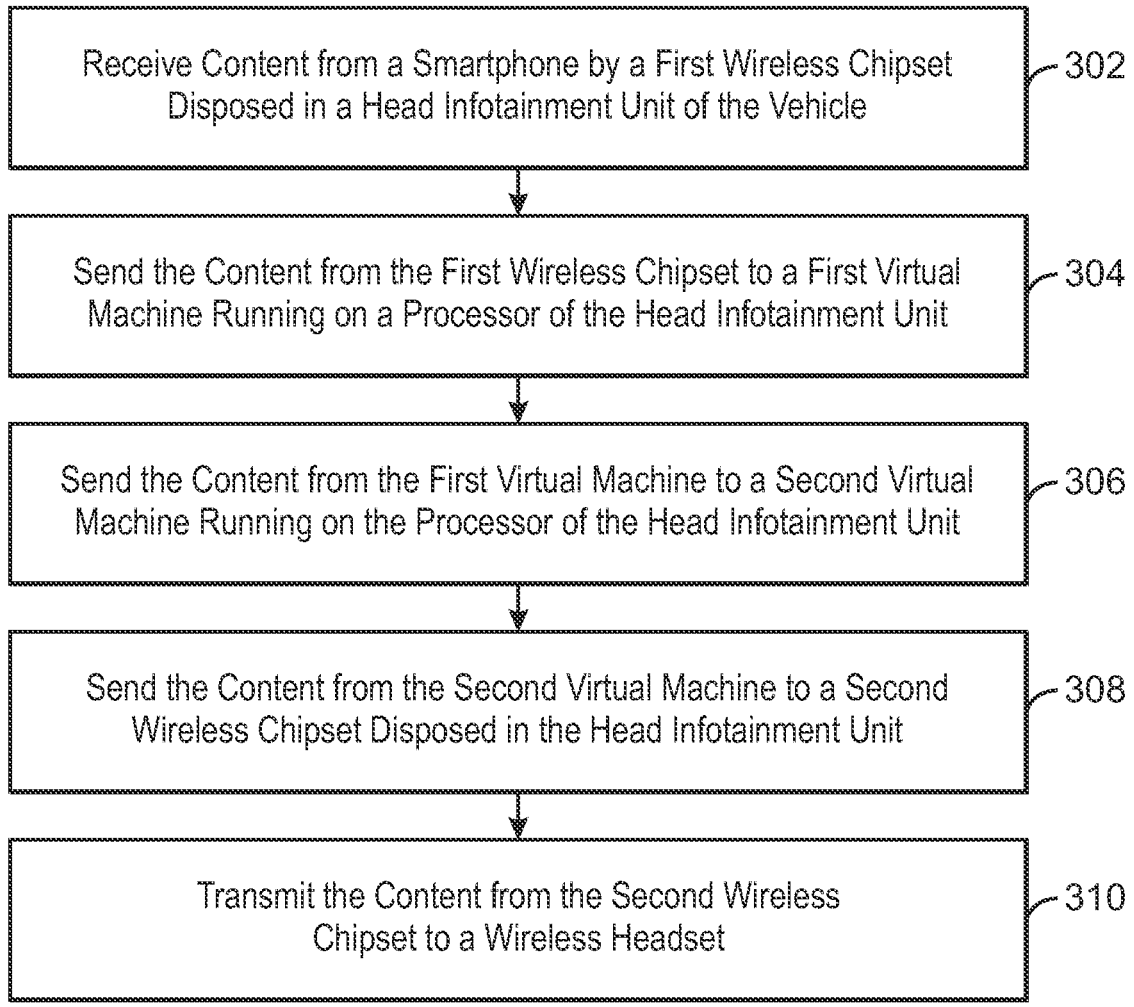
FIG. 3 is a process flow diagram of an example method for operating a wireless headset system for a vehicle.

FIG. 3 is a process flow diagram of an example method for operating a wireless headset system for a vehicle. Each of the functions of this method 300 can be performed by individual components, in parallel, and/or in an ongoing basis to form a pipeline of continuously updating information and actions. The method 300 may be performed by the infotainment head unit shown in FIGS. 1 and 2 and implemented by logic embodied in hardware, such as logic circuitry or one or more processors configured to execute instructions stored in a non-transitory, computer-readable medium. The method may begin at block 302.

At block 302, content is received from a smartphone by a first wireless chipset disposed in a head infotainment unit of the vehicle. The smartphone may be a personal smartphone that the user of the smartphone has paired with the head infotainment unit through the first wireless chipset. The content may be audio data, an intercom message, and the like.

At block 304, the content is sent from the first wireless chipset to a first virtual machine running on a processor of the head infotainment unit.

At block 306, the content is sent from the first virtual machine to a second virtual machine running on the processor of the head infotainment unit. The communication of the content from the first virtual machine to a second virtual machine may be handled by a hypervisor.

At block 308, the content is sent from the second virtual machine to a second wireless chipset disposed in the head infotainment unit. Additionally, in some embodiments, audio alerts generated by the head infotainment unit may be inserted into the content by the second virtual machine.

At block 310, the content is transmitted from the second wireless chipset to a wireless headset to be rendered by the wireless headset. The wireless headset may be a personal headset that the user of the headset has paired with the head infotainment unit through the second wireless chipset. The wireless headset may be associated with the same user as the smartphone, for example, when the user is streaming audio to the user's own headset. Additionally, the wireless headset may be associated with a different user, for example, when sending or receiving an intercom message or when sharing audio content with other users.

In addition to transferring content from the smartphone to the wireless headset, the head infotainment unit can also receive additional content to be consumed by the head infotainment unit. For example, a voice command may be received from the smartphone by the first wireless chipset, which sends the voice command to the first virtual machine. The first virtual machine can process the voice command to identify an action to perform, and send a corresponding control signal to a subsystem of the vehicle in accordance with the identified action. The first virtual machine can also send confirmation messages to the user that issued the voice command. The confirmation message may be an audio message generated by the first virtual machine and sent to the second virtual machine for transmission to the user's headset.

The method 300 should not be interpreted as meaning that the blocks are necessarily performed in the order shown. Furthermore, fewer or greater actions can be included in the method 300 depending on the design considerations of a particular implementation.

The invention may be susceptible to various modifications and alternative forms, specific embodiments have been shown by way of example. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A wireless headset system for a vehicle, comprising:
   a first wireless chipset to handle communication with a smartphone;
   a second wireless chipset to handle communication with a headset; and
   a processor configured to execute a first virtual machine to control the first wireless chipset and a second virtual machine to control the second wireless chipset.

2. The wireless headset system of claim 1, wherein the processor is configured to receive audio from the smartphone and route the audio to the headset.

3. The wireless headset system of claim 1, wherein the processor is communicatively coupled to an audio subsystem of the vehicle, and the processor is configured to enable a passenger to select an audio stream generated by the audio subsystem to be routed to the headset by the processor.

4. The wireless headset system of claim 1, wherein the processor is configured to insert an alert into an audio stream routed to the headset.

5. The wireless headset system of claim 4, wherein the alert comprises at least one of:
   a navigation alert generated by a navigation subsystem of the vehicle;
   a safety alert describing a status of one or more of the vehicle's subsystems; and
   a traffic alert received wirelessly from a remote computing device.

6. The wireless headset system of claim 1, wherein:
   the smartphone is associated with a first passenger and the first wireless chipset is to handle communication with an additional smart phone associated with a second passenger; and
   the headset is associated with the first passenger and the second wireless chipset is to handle communication with an additional headset associated with the second passenger.

7. The wireless headset system of claim 6, wherein the processor is configured to enable the first passenger to select the second passenger to receive an intercom message, and route the intercom message from the headset associated with the first passenger to the additional headset associated with the second passenger.

8. The wireless headset system of claim 6, wherein the processor is configured to enable the first passenger to select an audio stream being streamed by the second passenger, and route the audio stream from the additional smartphone associated with the second passenger to the headset associated with the first passenger.

9. The wireless headset system of claim 1, wherein the processor is configured to receive a voice command from the headset, process the voice command to identify an action, and perform the action.

10. The wireless headset system of claim 9, wherein the voice command is at least one of:
    a request for media to be delivered to the headset; and
    a request to control a subsystem of the vehicle.

11. A method of operating a wireless headset system for a vehicle, comprising:
    receiving content from a smartphone by a first wireless chipset disposed in a head infotainment unit of the vehicle;
    sending the content from the first wireless chipset to a first virtual machine running on a processor of the head infotainment unit;
    sending the content from the first virtual machine to a second virtual machine running on the processor of the head infotainment unit;
    sending the content from the second virtual machine to a second wireless chipset disposed in the head infotainment unit; and
    transmitting the content from the second wireless chipset to a wireless headset.

12. The method of claim 11, wherein the content is audio being streamed to the smartphone of a passenger and the headset is associated with the passenger.

13. The method of claim 11, wherein the content is an intercom message spoken into the headset by a first passenger and the headset is associated with a second passenger.

14. The method of claim 11, comprising inserting, by the second virtual machine, an audio alert into the content before sending the content to the second wireless chipset.

15. The method of claim 11, comprising receiving a voice command from the headset by the second wireless chipset, sending the voice command from the second wireless chipset to the second virtual machine, and processing the voice command via the first virtual machine to identify an action to perform, and sending a control signal to a subsystem of the vehicle in accordance with the identified action.

16. A non-transitory computer-readable medium comprising instructions to direct the actions of a processor to operate a head infotainment unit of a vehicle, the instructions to direct the processor to:
    receive, at a first virtual machine running on the processor, audio data from a smartphone via a first wireless chipset disposed in the head infotainment unit;
    send the audio data from the first virtual machine to a second virtual machine running on the processor; and
    send the audio data from the second virtual machine to a second wireless chipset disposed in the head infotainment unit, wherein the second wireless chipset is to transmit the audio data to a wireless headset to be rendered.

17. The non-transitory computer-readable medium of claim 16, wherein the audio data is streamed to the smartphone of a passenger and the headset is associated with the passenger.

18. The non-transitory computer-readable medium of claim 16, wherein the audio data is an intercom message spoken into the headset by a first passenger and the headset is associated with a second passenger.

19. The non-transitory computer-readable medium of claim 16, wherein the instructions direct the processor to, by the second virtual machine, insert an audio alert into the audio data before sending the audio data to the second wireless chipset.

20. The non-transitory computer-readable medium of claim 16, wherein the instructions direct the processor to:
- receive, at the first virtual machine, a voice command from the headset via the second wireless chipset;
- process the voice command via the first virtual machine to identify an action to perform; and
- and send a control signal from the first virtual machine to a subsystem of the vehicle in accordance with the identified action.

\* \* \* \* \*